United States Patent
Chiu

[11] Patent Number: 5,263,406
[45] Date of Patent: Nov. 23, 1993

[54] VACUUM TYPE FOOD FRYING APPARATUS

[76] Inventor: Yao-Jui Chiu, No. 52, Tieh Hsi Ts'un, Hsi Kou Hsiang, Chiayi Hsien, Taiwan

[21] Appl. No.: 24,766
[22] Filed: Mar. 2, 1993
[51] Int. Cl.$^5$ .................................. A47J 37/12
[52] U.S. Cl. .......................... 099/407; 099/403; 099/408; 099/410; 099/472; 210/167; 210/DIG. 8
[58] Field of Search .............. 099/330, 403, 407–410, 099/416, 417, 472; 426/519, 520, 523, 438; 210/167, DIG. 8

[56] References Cited

U.S. PATENT DOCUMENTS

| | | | |
|---|---|---|---|
| 3,501,316 | 3/1970 | Guthrie, Sr. | 99/407 |
| 3,534,677 | 10/1970 | Keathley | 99/411 |
| 3,563,158 | 2/1971 | Omer | 99/410 |
| 4,031,820 | 6/1977 | Reed | 99/408 |
| 4,059,046 | 11/1977 | Yamazaki et al. | 99/472 |
| 4,287,818 | 9/1981 | Moore et al. | 99/407 |
| 4,732,081 | 3/1988 | Sakuma | 426/438 |
| 4,873,920 | 10/1989 | Yang | 99/330 |
| 5,018,438 | 5/1991 | Grandi | 99/407 |
| 5,168,797 | 12/1992 | Wang | 99/410 |
| 5,179,891 | 1/1993 | Chiu | 210/167 X |

FOREIGN PATENT DOCUMENTS 1185225 7/1989 Japan ........................ 99/407

Primary Examiner—Timothy F. Simone
Attorney, Agent, or Firm—Bacon & Thomas

[57] ABSTRACT

An improved vacuum type food frying apparatus is mainly equipped with a food feeding device, a frying tank, an output device, a vacuum generating device, an oil heating and filtering device, an oil recycling and storing device. Food put in a plurality of baskets goes through a vibrated conveyor platform and is dehydrated by hot air blow and then is dispensed to different layers of the frying tank which is filled with frying oil stored in the oil recycling and storing device and constantly heated and filtered in circulation by the oil heating and filtering device; afterwards, the frying tank is vacuumized and the food in the baskets is intermittently shaken by way of an vibrated frame. After the food is properly fried, the food receiving baskets are lifted up and taken out of the frying tank and delivered to the output device which is actuated to vibrate and cooled by cold air blow.

6 Claims, 4 Drawing Sheets

VACUUM TYPE FOOD FRYING APPARATUS

BACKGROUND OF THE INVENTION

The present invention relates to an improved vacuum type food frying apparatus which is mainly equipped with a food feeding device, a frying tank, an output device, a vacuum generating device, an oil heating and filtering device, an oil recycling and storing device. The food to be fried is put in a number of meshy baskets which are delivered to a conveyor platform and subject to vibration and hot air blow so as to get the processed food dehydrated or dried first and further dispensed onto a respective layer of a frame. Then frying oil which is constantly heated and filtered by the oil heating and filtering device is supplied to the frying tank from the oil recycling and storing device; and the frying pan is vacuumized by the vacuum generating device simultaneously with the meshy baskets intermittently shaken for bettering the frying; afterwards, the net baskets taken out of the frying tank and transmitted to the output device are subject to cold air blow and vibration to complete the frying process.

In general, the conventional frying process is carried out with heated oil which food is immersed in and is directly exposed to the air, resulting in the quality of the frying oil rapidly going deteriorated with its color getting black due to constant oxidizing in the air.

There are many disadvantages associated with the traditional frying process and the most serious problem thereof is that the quality of the fried food can be spoiled as a result of the constant deterioration of the frying oil directly exposed to the air, and so processed food can have bad effect on the health of persons taken it.

SUMMARY OF THE INVENTION

Therefore, the primary object of the present invention is to provide an improved vacuum type food frying apparatus which is equipped with a vibration and hot air blowing means which can get the meshy baskets shaken vertically and horizontally with hot air blown on the food so as to remove the moisture or water particles thereon, preventing the frying oil from being spoiled by the water particles; and the fried food is shaken in the same manner with cold air blown thereon so as to reduce the oil content in the food and to cool the same down.

Another object of the present invention is to provide an improved vacuum type frying apparatus the operation procedure thereof can be controlled by a personal computer PC.

The other object of the present invention is to provide an improved vacuum type frying apparatus which is provided with a oil circulating and heating device so as to keep the temperature of the frying oil even in the frying tank, improving the quality of the frying food.

One further object of the present invention is to provide an improved vacuum type food frying apparatus which is equipped with a food feeding device whereby food put in meshy baskets can be fed into the frying tank with ease.

One further object of the present invention is to provide an improved vacuum type food frying apparatus which is equipped with an oil recycling and filtering device which can filter and remove impurities in the frying oil constantly so as to keep the same in good quality and prolong the use thereof.

One still further object of the present invention is to provide an improved vacuum type food frying apparatus which is equipped with a heating and filtering device which can get the frying oil heated indirectly so as to keep the food fried totally and evenly without scorching the surface thereof; and the filtering device can bring the impurities of the frying oil out of frying tank so as to make the color of the fried food good.

One still further object of the present invention is to provide an instant oil heating device which can speedily get the frying oil heated with the temperature thereof at any point in the frying tank even.

One still further object of the present invention is to provide an improved frying apparatus which can filter and remove impurities from the frying oil so as to make the cleaning of the frying tank thereof easy.

One still further object of the present invention is to provide an improved frying apparatus which is provided with roomy meshy baskets in which food is received so as to prevent the fried food from being deformed in frying.

DETAILED DESCRIPTION OF THE PREFERRED EMBODIMENTS

Figure 1:
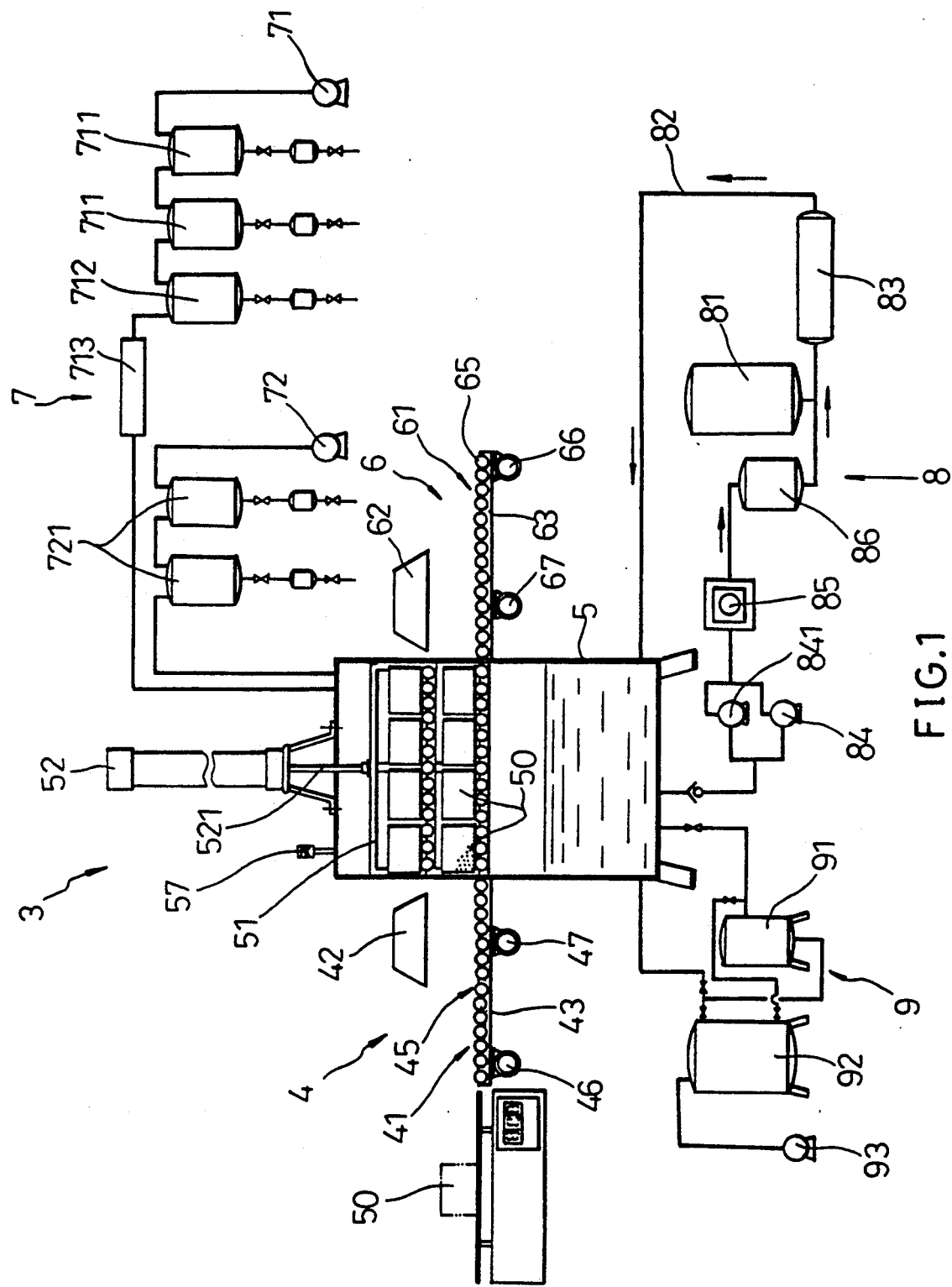
FIG. 1 is a diagram showing the structure of the present invention.

Referring to FIGS. 1, 2, 3, 4, the vacuum type frying apparatus 3 of the present invention is comprised of a food feeding device 4, a frying tank 5, an output device 6, a vacuum generating device 7, an oil heating and filtering device 8, an oil recycling and storing device 9.

The food feeding device 4 is equipped with a conveyor platform 41 and a hot air blowing means 42 disposed on top of the conveyor platform 41. The conveyor platform 41 comprises a bracket 43 having a plurality of consecutive parallel rollers 45 disposed thereon and a first vertical vibration motor 46 and a first horizontal vibration motor 47 to get the bracket 43 vertically and horizontally shaken.

Figure 2:
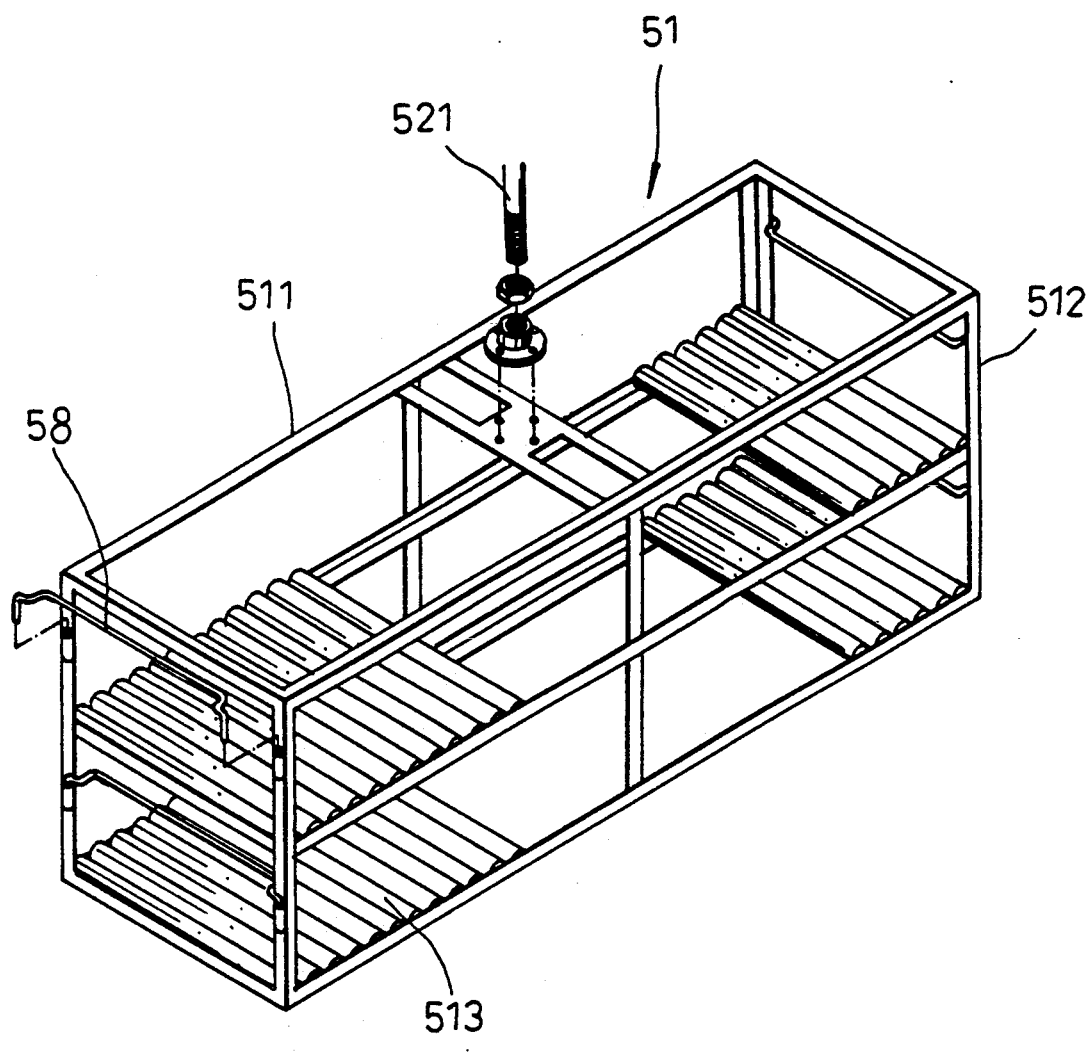
FIG. 2 is a perspective view of the frame of the present invention.
Figure 3:
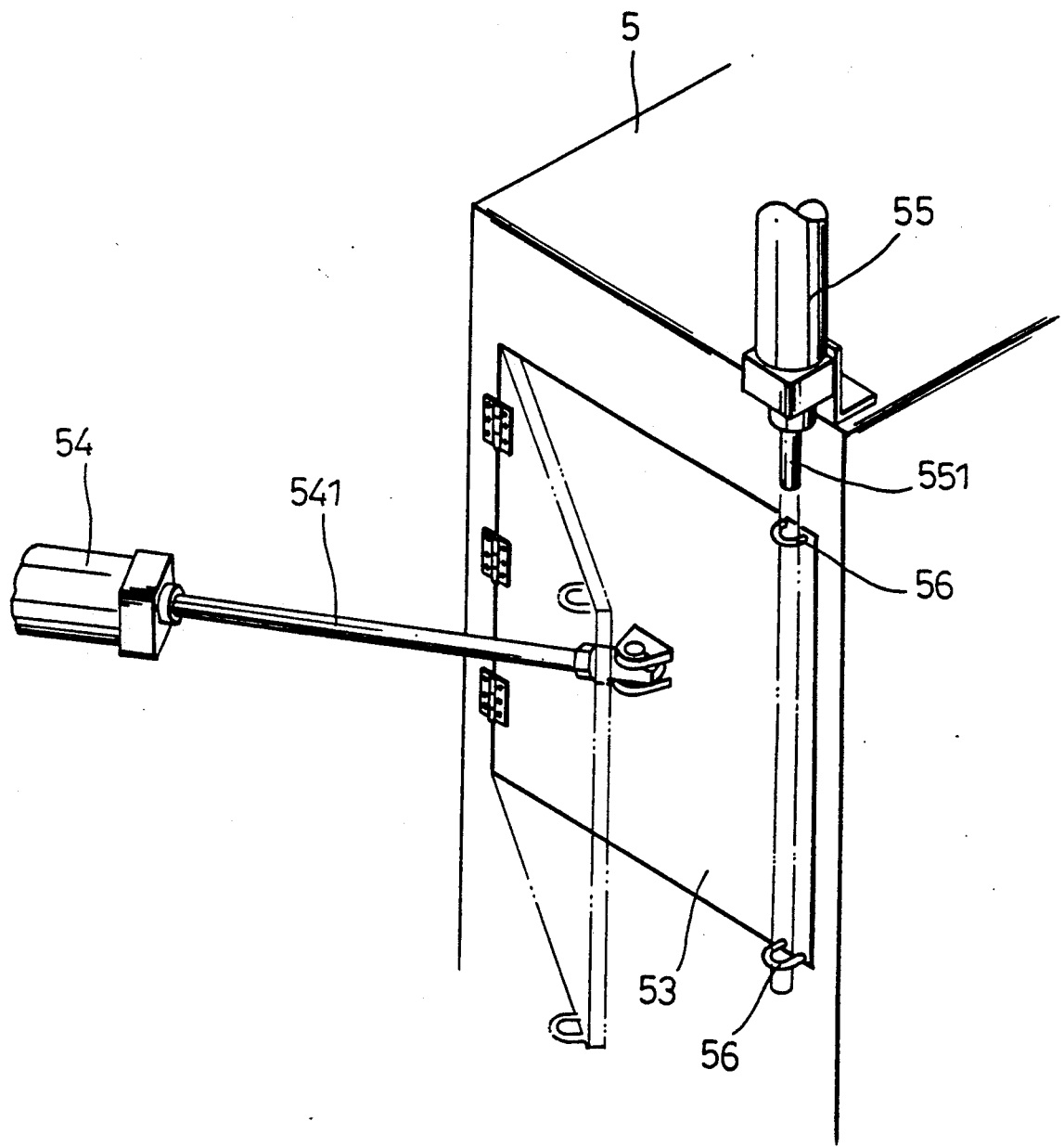
FIG. 3 is a partial diagram showing the structure of the door of the frying tank of the present invention.

The frying tank 5 is a squarely built tank with heat-preserving material disposed in the interior all therearound. Inside the tank 5 is disposed a frame 51, as shown in FIG. 2, which is comprised of a number of shaped spaced layers 511 that are connected to each other by side brackets 512. Each layer 511 is provided with a plurality of parallel rollers 513. A hydraulically operated ar 521 connected to a hydraulic cylinder 52 at one end and led through the top of the tank 5 and secured to the middle of the top layer 511 of the frame 51 at the other end. At each side of the frying tank 5 is disposed a hinged door 53 operated by a hydraulically actuated arm 541 associated with a hydralic cylinder 54. The door 53 is provided with a pair of restraint members 56 and a latch means 551 connected to a hydraulic cylinder 55 at one end can be retrievably extended to engage with the restraint members 56 so as to get the door locked or opened.

The output device 6 comprises an delivery platform 61 and a cold air blowing device 62 disposed on top of the conveyor platform 61. The conveyor platform is made up of a rectangular frame 63 having a plurality of parallel rollers 65 disposed thereon and a second vertical vibration motor 66 and a second horizontal vibration motor 67 are disposed under the conveyor platform 61.

The vacuum generating device 7 is made up of a preliminary vacuum system and a main vacuum system wherein the preliminary vacuum system has a first vacuum pump 71 in series connection to a pair of coolers 711, an auxiliary tank 712 and a cooling device 713 and finally to the frying tank 5; and the main vacuum system has a second vacuum pump 72 in series connection to a pair of coolers 721 and to the frying tank 5.

The oil heating and filtering device 8 is equipped with an oil supplementing tank 81 in connection to a pipe line 82 via a valve means; and an instant heating device 83 is disposed on the pipe line 82 which is coupled to both sides of the frying tank 5. The bottom of the frying tank 5 is connected to a pump 84 which is in parallel association with a standby pump 841, a filter device 85 and a filtering machine 86 so as to form a circulation loop.

Figure 4:
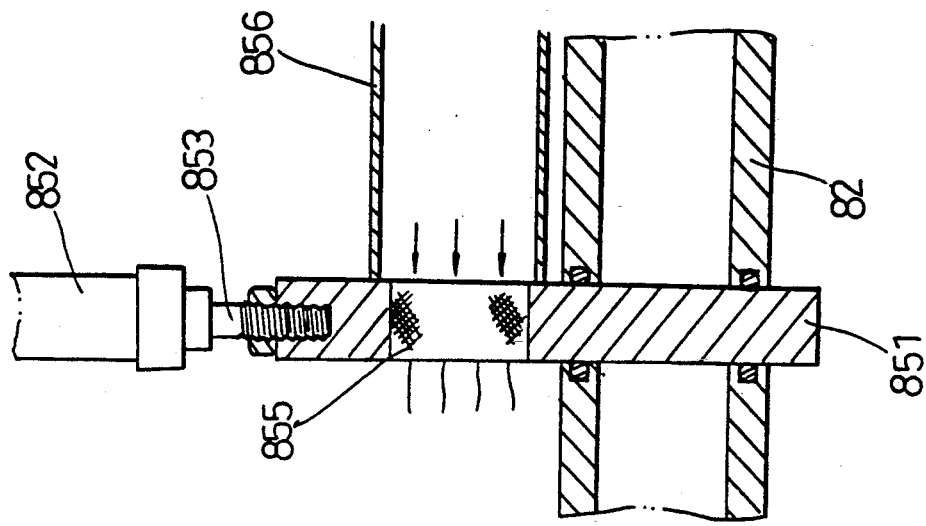
FIG. 4 is a diagram showing the operation of a filtering device thereof.
Figure 4:
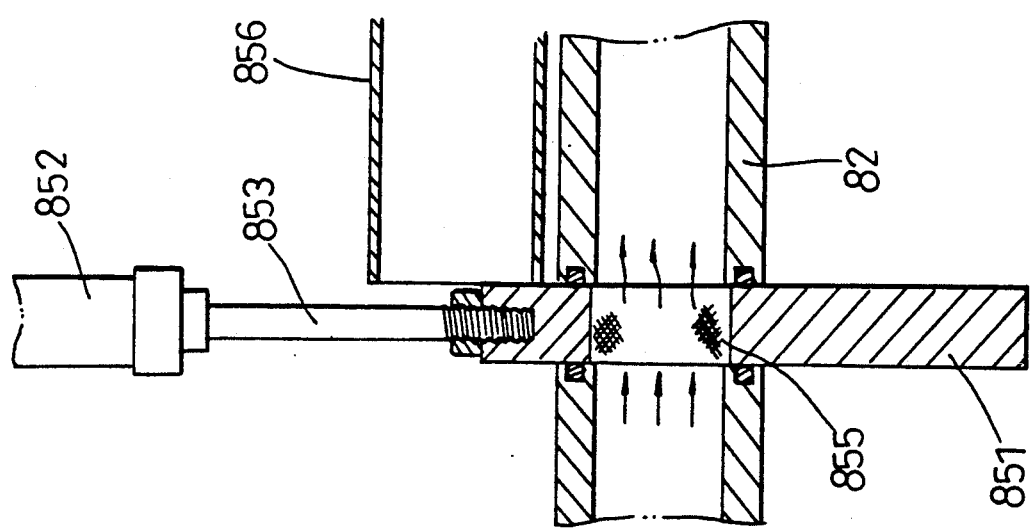

The filter device 85 is equipped with a filter plate 851 disposed laterally and partially inside the pipe line 82 and vertically movable therein, as shown in FIG. 4. The top side of the filter plate 851 is engaged with one end of a connection arm 853 which is actuated by a hydraulic cylinder 852. A through hole is disposed on the filter plate 851 with filtering means 855 disposed therein. Right above the pipe line 82 and adjacent the vertically movable filter plate 851 is disposed a blow pipe 856 which can provide forced air against the filtering means 855 as the filter plate 851 is lifted up so as to make the accumulated particles thereon to be removed.

The oil recycling and storing device 9 is comprised of a filtering tank 91, a hollow reservoir 92. The upper portion of the filtering tank 91 is connected to the bottom of the frying tank 5 by way of a valve controlled branch pipe and the bottom of the filtering tank 92 is in connection to the top portion of the reservoir 92 at the side thereof. The top of the reservoir 92 is in communication with a vacuum pump 93 having a switching valve in association therewith (not shown) and to the side of the lower portion of the reservoir 92 is connected to a valve controlled pipe in communication with the main oil supply pipe.

The operation of the present invention is detailed in the following description:

1. The processed food such as vegetable, fruit, meat and seafood is put in a meshy basket 50 which is weighed by an electrical weighing means and then is transmitted to the conveyor platform 41 of the feeding device 4 and is shaken vertically and horizontally thereon; in the meanwhile, the food is blown by hot air to raise the temperature thereof and to remove the water thereon, and the baseket is further delivered to the frying tank 5.

2. The above procedure is repeated with baskets 50 continually dispatched to one same layer of the frame until the layer is full, afterwards, the hydraulic cylinder 52 is actuated to bring the frame 51 one layer down so as to repeat filling another empty layer with baskets 50 in the same manner. The procedure is repeated until all the layers of the frame 51 are occupied. Each side bracket 512 is provided with a stop member 518 at each layer thereof so as to limit the baskets 50 in place.

3. To actuate the hydraulic cylinder 54 to push the arm 541 against the door 53 so as to keep the same shut and the hydraulic cylinder 55 is driven to move the latch means 551 downwardly and engage with the restraint members 56 to securely close the door 53.

4. To pump out the air in the frying tank 5 by way of the vacuum generating device 7 to the extent of 60 torrs, and in the meanwhile, the frying tank is filled with frying oil from the reservoir of the oil recycling and storing device as a result of a vacuum effect. The oil in the frying tank 5 flows to the oil heating and filtering device 8, via the pipe line 82 and the pump 84, a filter unit 85, a filtering machine 86, and further to the instant heating device 83; and circulates back into the frying tank 5 again until the temperature of the oil reaches 130° C. The filter unit 85 is comprised of the filter plate 851 having a through hole provided with a filtering means 855 and disposed in alignment with the tubular passage of the pipe line 82 so that oil can flow the filtering means 855 to get large particles of impurities filtered. Once the volume of the frying oil flowing in the pipe line 82 is markedly reduced, it indicates that the filtering means 855 is blocked by impurities. At this instant, the hydraulic cylinder 852 is actuated to lift up the filtering plate 851 to such a position that the filtering means 855 is located in alignment with the air blow tube 856 which can blow pressurized air in a reversely onto the filtering means 855 so as to remove the accumulated particles on the filtering means 855, then the filtering plate 851 is relocated with the filtering means 855 thereof in alignment with the tubular passage of the pipe line for reuse.

5. The arm 521 actuated by the hydraulic cylinder 52 plunges the frame 51 into frying oil to start the frying process. Since the foods to be fried are different in nature so that the temperature of the oil must be generally set between 95° C.–130° C. which can be selectively set on a control panel by way of a control knob. During the process of frying, the hydraulic cylinder 52 will actuate the frame 51 to shake for one minute in every 4 minutes until there are no bubbles produced in the frying tank containing the frying oil and the fried food by the observation through a transparent glass, indicating the completion of the frying. As the vacuum state of the frying tank is set at about 2 torrs and the time used is about 15 minutes, a vacuum frying effect is obtained. The temperature, time lapse, and the vacuum state for different kinds of food are varied from one to another, depending on the nature of the food. For instance, apples are fried at the temperature of 98° C. for 15 minutes, and grapes, beans are fried at 110° C. for 18 minutes.

6. To lift the frame 51 immersed in the oil up away therefrom, the arm 521 of the hydraulic cylinder 52 is actuated to effect the purpose and the frying tank 5 is vacuumized continuously for 3 minutes, afterwards, a relief valve 57 is opened to let air flush in, making the vacuum state fade out.

7. To open the door 53 on the side of the frying tank 5 adjacent to the output device 6 and the meshy baskets 50 are drawn out thereof one by one and transmitted to the output device 6 on which the baskets 50 are vibrationally shaken up and down and right to left with cold air blown thereon, cooling the same off so as to effectively de-oil the fried food effectively.

It can be clearly seen that the present vacuum type food frying apparatus is automatically operated with the capability of mass and speedy processing of all kinds of fried food in a hygienic manner, resulting in the saving of labor and shortening of operation time; and the so fried food has a good taste with low oil content, and can be fried thoroughly and evenly and be kept in good shape without deformation; and the frying oil can be recycled repeatedly and reused for a longer period of time.

I claim:

1. An improved vacuum type food frying apparatus, comprising a food feeding means, a vacuum generating means, a frying means, an output means, an oil heating and filtering means and an oil recycling and storing means; said vacuum generating means being associated with said frying means by pipes; said oil heating and filtering means being in association with said frying means by pipes; said oil recycling and storing means being associated with said frying means by pipes; wherein the improvement thereof is characterized in that:

said food feeding means is provided with a delivering means which is associated with a vertical vibration means and a horizontal vibration means so that the food to be fried can be shaken accordingly thereon; a hot air blowing means is disposed above said delivering means;

said frying means has a frame disposed inside thereof and provided with a number of layers each of which is equipped with parallelly located roller means; and a cylinder operated arm means is associated with said frame so as to lift up or lower down the same in operation; said frying means has a cylinder actuated entrance that is associated with said delivering means of said food feeding means and an exit that is associated with said output device;

said output means has a delivering means which is associated with a vertical vibration means and a horizontal vibration means that are used to get said delivering means shaken;

a cold air blowing means is disposed above said output means which is used to cool off said fried food;

said heating and filtering means in circulating communication with said frying means by way of a pipe has an instant heating means disposed therebetween and a valve controlled oil supplement tank associated therewith; and a motor means and a standby motor means in parallel communication to each other are coupled to a filter unit and a filtering means at an oil outlet of said frying means;

whereby food is fed by said delivering means of said food feeding means which is shaken vertically and horizontally before into said frying means and dispensed onto a layer of said frame one layer after the other, and said entrance of said frying means is tightly closed and said vacuum generating means is actuated to keep said frying means vacuumized; then said frying means is charged with oil by said oil recycling and storing means; and said oil is circulated to said heating and filtering means continuously until a set temperature is reached; and said frame is lowered down to get the food immersed in the oil for frying for a period of time; then said frame is lifted up with said food transmitted by said delivering means of said output means out of said frying means via said exit thereof and is vertically and horizontally shaken by said vibration means with cold air blown thereon simultaneouly to complete the frying process.

2. An improved vacuum type food frying apparatus as claimed in claim 1 wherein said delivering means of both said food feeding means and said output means has a conveyor platform made up of a plurality of spaced parallel rollers which are disposed in continuous alignment with said rollers of each layer of said frame, permitting to-be-fried food received in meshy baskets to be transmitted into said frying means.

3. An improved vacuum type food frying apparatus as claimed in claim 1 wherein said oil heating and filtering means has a filter means which is equipped with a filter plate partially and crossedly disposed inside a pipe and connected to a hydraulic cylinder and having a through hole at the center thereof with a removable filter located thereat whereby said filter plate can be lifted up for cleaning purpose.

4. An improved vacuum type food frying apparatus as claimed in claim 1 wherein said filtering means has an air blow tube disposed right above the pipe inside which said filter plate is partially located in such a manner that as said filter plate is lifted up, said filter is located in right front of said air blow tube whereby the impurities accumulated on the filter can be removed by forced air, then said filter plate is relocated for use.

5. An improved vacuum type food frying apparatus as claimed in claim 1 wherein each of said entrance and exit doors of said frying means is cylinder actuated and is also provided with a cylinder actuated latch means which can be in selective locking engagement with restraint members, permitting said doors to be sealedly closed in operation.

6. An improved vacuum type food frying apparatus as claimed in claim 1 wherein the frying process can be programmed in a PC so as to effect the automatic control of the frying operation thereof.

* * * * *